United States Patent
Fryman et al.

(10) Patent No.: US 8,935,775 B2
(45) Date of Patent: Jan. 13, 2015

(54) METHOD AND APPARATUS FOR DISHONEST HARDWARE POLICIES

(71) Applicants: Joshua Fryman, Corvallis, OR (US); Nicholas Carter, Hillsboro, OR (US); Robert Knauerhase, Portland, OR (US); Sebastian Schoenberg, Hillsboro, OR (US); Aditya Agrawal, Urbana, IL (US)

(72) Inventors: Joshua Fryman, Corvallis, OR (US); Nicholas Carter, Hillsboro, OR (US); Robert Knauerhase, Portland, OR (US); Sebastian Schoenberg, Hillsboro, OR (US); Aditya Agrawal, Urbana, IL (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 13/630,592

(22) Filed: Sep. 28, 2012

(65) Prior Publication Data

US 2014/0096235 A1 Apr. 3, 2014

Related U.S. Application Data

(60) Provisional application No. 61/665,614, filed on Jun. 28, 2012.

(51) Int. Cl.
*G06F 12/14* (2006.01)
*G06F 12/00* (2006.01)
*G06F 13/16* (2006.01)

(52) U.S. Cl.
CPC ............... *G06F 12/14* (2013.01); *G06F 12/00* (2013.01); *G06F 13/16* (2013.01)
USPC ................... 726/17; 726/1; 726/21; 713/193; 711/152; 711/163

(58) Field of Classification Search
CPC .................. G06F 21/78–21/80; G06F 21/805; G06F 12/14; G06F 12/1416; G06F 12/1458; G06F 12/1483
USPC .......... 726/1, 17, 21; 711/1, 6, 163, 164, 152; 713/193
See application file for complete search history.

(56) References Cited

U.S. PATENT DOCUMENTS

| | | | |
|---|---|---|---|
| 7,383,584 B2 * | 6/2008 | Strongin et al. | 726/27 |
| 7,725,558 B2 * | 5/2010 | Dickenson | 709/215 |
| 2002/0042895 A1 * | 4/2002 | Harris et al. | 714/42 |
| 2003/0188169 A1 * | 10/2003 | Strongin et al. | 713/181 |
| 2003/0196088 A1 * | 10/2003 | Poisner et al. | 713/172 |
| 2005/0216611 A1 * | 9/2005 | Martinez | 710/22 |
| 2007/0277009 A1 * | 11/2007 | Anschel et al. | 711/159 |
| 2008/0163366 A1 * | 7/2008 | Chinya et al. | 726/21 |
| 2008/0195829 A1 * | 8/2008 | Wilsey | 711/163 |
| 2009/0094429 A1 * | 4/2009 | Boule et al. | 711/163 |
| 2009/0216913 A1 * | 8/2009 | Moriki et al. | 710/4 |
| 2011/0035376 A1 * | 2/2011 | Kirshenbaum | 707/737 |
| 2012/0079590 A1 * | 3/2012 | Sastry et al. | 726/21 |

OTHER PUBLICATIONS

S. Bellovin. "RFC 3514: The Security Flag in the IPv4 Header" Published Apr. 1, 2003, ©2003 The Internet Society (6 pages) http://www.rfc-editor.org/pdfrfc/rfc3514.txt.pdf.*

\* cited by examiner

*Primary Examiner* — Joseph P Hirl
*Assistant Examiner* — Thomas Gyorfi
(74) *Attorney, Agent, or Firm* — Blakely, Sokoloff, Taylor & Zafman LLP

(57) ABSTRACT

A system implements dishonest policies for managing unauthorized access requests. The system includes memory management hardware to store a set of dishonest policy bits, each dishonest policy bit that is configured to a predetermined value indicating disallowed access for one of a set of memory ranges. When a processor receives an access request for a location in a memory range to which access is not allowed as indicated by a set dishonest policy bit, the processor returns a false indication according to a dishonest policy that the requested access has been performed.

20 Claims, 13 Drawing Sheets

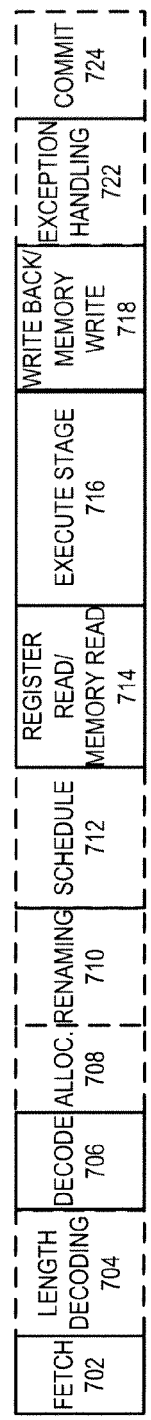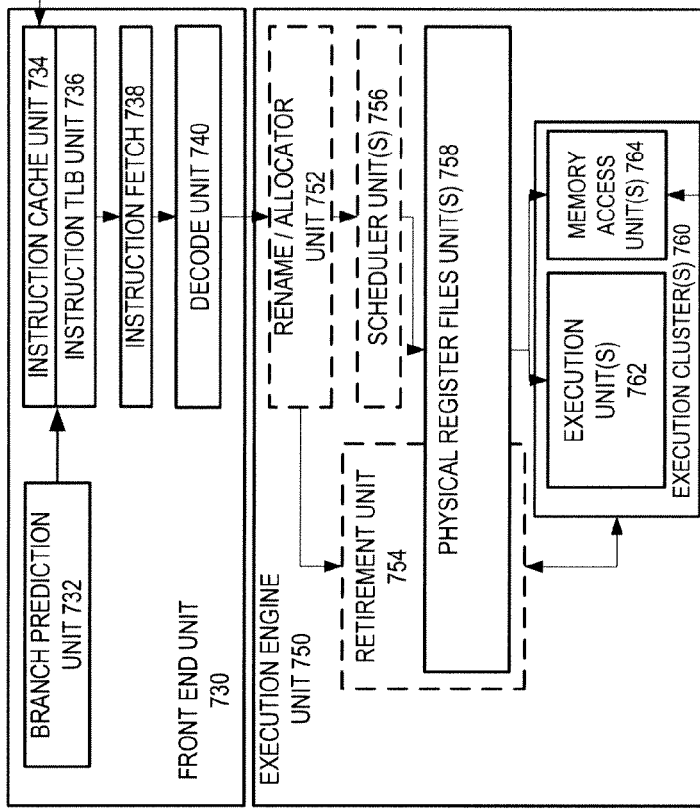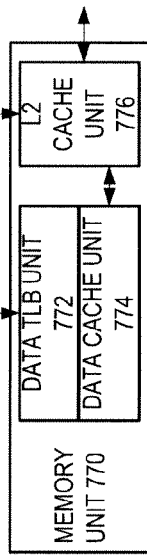

METHOD AND APPARATUS FOR DISHONEST HARDWARE POLICIES

The present application is a non-provisional application of Application No. 61/665,614, filed Jun. 28, 2012.

FEDERALLY SPONSORED RESEARCH

The United States Government has rights in this invention pursuant to Defense Advanced Research Projects Agency (DARPA) High Performance Computing (UHPC) program Contract No. HR0011-10-3-0007 with Intel Corporation.

TECHNICAL FIELD

Embodiments of the invention relate to a computer system; and more specifically, to memory management in a computer system.

BACKGROUND ART

Conventional computer systems are generally susceptible to side channel attacks. Side channel attacks are based on side channel information that is not directly derived from the protected contents. Such side channel information includes access permission information, timing information, power variation information, etc. For example, a side channel attacker can send hundreds or thousands of access requests to a memory region. Denied access to a memory location is an indication that the location may store sensitive information (e.g., passwords, encryption/decryption keys, etc.). Based on whether access to memory is granted or not, an attacker can identify the location in which sensitive information is likely stored. The identified memory location, together with timing information, provides an attacker with sufficient knowledge to launch a direct attack on the memory where access to data was not granted.

One existing technique for protecting memory contents is to encrypt the memory where reads with an incorrect key will return random results. However, permanent encryption and decryption is very power consuming and would be a very expensive solution if memory encryption is otherwise not needed.

BRIEF DESCRIPTION OF THE DRAWINGS

Embodiments are illustrated by way of example and not limitation in the Figures of the accompanying drawings:

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide a mechanism for "dishonest" hardware policies, where trusted software can map regions of memory to be dishonest about their protection and their contents. The dishonest hardware policies prevent an attacker from obtaining permission information that can be used for side channel attacks. The mechanism denies two types of information to potential attackers: first, the implied knowledge that a failed load (i.e., read) or store (i.e., write) is to a protected location; second, the actual contents—encrypted or otherwise—of the protected location. The mechanism also eliminates the need for expensive exception handling when access is not granted. Building an exception stack and synchronizing the instruction pipeline can be power intensive, and can also change the execution timing behavior.

In one embodiment, the dishonest hardware policies are implemented by extending access permission bits in a page table. In addition to read and write permission bits, the page table can include a number of dishonest policy bits, each corresponding to a different dishonest policy that directs the system as to how to respond to an access request. In an alternative embodiment, the dishonest bits can be stored in a hardware permission table, which is separate from the page table and have configurable memory ranges for each set of dishonest bits. The implementation cost for these dishonest policy bits is low. Further, the operations for carrying out the dishonest policies do not consume significant amounts of power, which is a major advantage over comparable solutions such as encryption.

Figure 1:
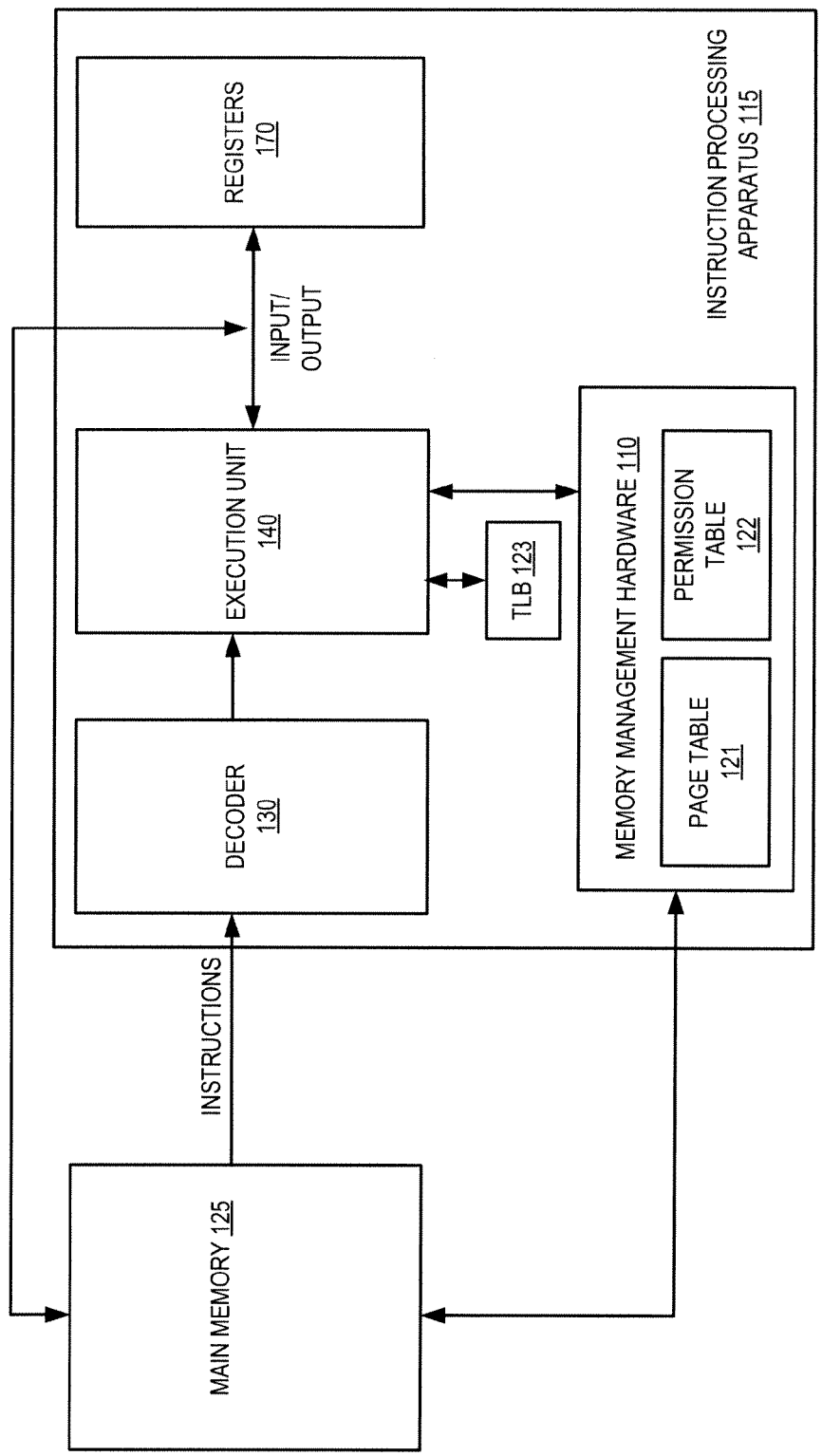
FIG. 1 is a block diagram of an example embodiment of an instruction processing apparatus having memory management hardware according to one embodiment.

FIG. 1 is a block diagram of an embodiment of an instruction processing apparatus 115 having an execution unit 140 operable to execute instructions. In some embodiments, the instruction processing apparatus 115 may be a processor, a processor core (also referred to as a core) of a multi-core processing system, or a processing element in an electronic system.

A decoder 130 receives incoming instructions from main memory 125 in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The execution unit 140 is coupled to the decoder 130. The execution unit 140 may receive from the decoder 130 one or more micro-operations, micro-code entry points, microinstructions, other instructions, or other control signals, which reflect, or are derived from the received instructions. The execution unit 140 also receives input operands from and generates output results to registers 170 or the main memory 125.

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 115 will be provided later with respect to FIGS. 7-13.

In one embodiment, the instruction processing apparatus 115 includes memory management hardware 110 to manage memory access. As the apparatus 115 receives a stream of binary instructions, the memory management hardware 110 monitors and manages memory access requests incurred by these instructions. In one embodiment, the memory management hardware 110 uses one or more page tables 121 to manage memory virtualization. The page table 121 is used to translate the virtual addresses seen by an application into physical addresses used by the hardware. The virtual and physical address spaces are organized as a collection of pages, with each page having a fixed size (e.g., 4K bytes). Each entry in the page table holds a flag indicating whether the corresponding page is resident in the main memory 125. If a page table entry for a corresponding page indicates that the page is not currently in the main memory 125, the hardware raises a page fault exception to cause the operating system to bring in that page from a secondary storage into the main memory 125. The memory management hardware 110 may cache a portion of the page table 121 in a translation lookaside buffer (TLB) 123 to speed up the address lookup process.

In one embodiment, the memory management hardware 110 also includes a permission table 122 to store access permission for different regions of the memory represented by different address ranges. The permission table 122 may carry address ranges in the physical address space, virtual address space, or both to provide more than one level of permission hierarchy. In one embodiment, access permission may be set for each memory page. In an alternative embodiment, access permission may be set for each configurable memory range. Although FIG. 1 shows the page table 121 and permission table 122 as separate tables, in some embodiments the page table 121 may be extended to include access permission bits, which indicate the access permission of each memory page. The access permission bits may include a read permission bit, a write permission bit, and a number of dishonest policy bits. Each of the dishonest policy bits indicates whether a corresponding dishonest policy is enabled for memory access. In one embodiment, the access permission bits can be modified only by trusted software. The memory regions being protected by the dishonest policies may store code, data, or a combination of both.

In an embodiment where the instruction processing apparatus 115 is a core of a multi-core processing system, each core may include or be associated with its own page table and permission table (or an extended page table including access permission bits) to manage access to the memory allocated to the core. The access permission bits associated with one core cannot be modified by another core.

In one embodiment, a number of permission tables can be implemented according to a fractal model. That is, multiple permission tables can be provided at multiple stages of a network, such that at every stage of network switch crossings, there is another permission table to further refine the permissions exposed and applied to the memory access operations.

Figures 2A, 2B:
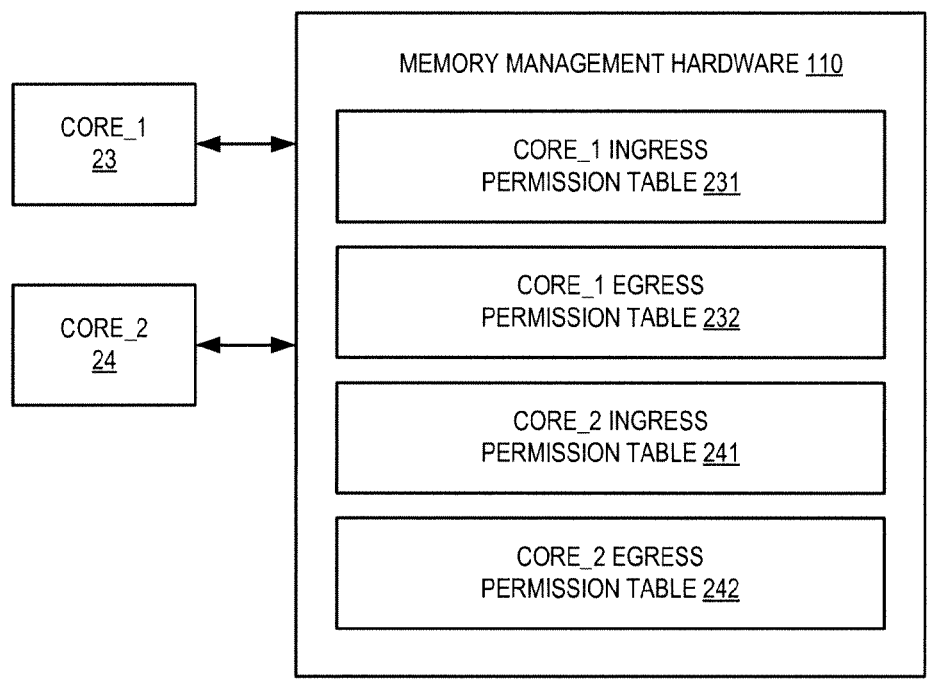
FIG. 2A and 2B illustrate examples of permission tables for storing dishonest permission bits according to one embodiment.

FIG. 2A is a block diagram illustrating an example of the permission table 122 according to one embodiment. The permission table 122 includes a list of address ranges, each corresponding to a memory range identified by a low address 210 and a high address 220. In an alternative embodiment, each address range may be indicated by a mask, such that hardware can logically AND the mask (or the mask inverse) with an input address and then OR the result. For example, if the protected address range is 00000000-0000FFFF, a permission table entry can store a mask 0000FFFF. Hardware logic can perform a logical AND on the input address and the inverted mask (FFFF0000), and then perform a logical OR on all of the resulting bits to determine if any of the bits are set. If any bits are set, then the input address is greater than the region of interest. If no bits are set, then the input address is in the protected address range, and the permissions table 122 is to be consulted. Other methods for identifying an address range may also be used.

For each address range, the permission table 122 provides a number of access permission bits 250 to indicate access permissions; for example, an "R" bit indicating read permission (e.g., 0: disallowed, 1: allowed), a "W" bit indicating write permission, and a number of dishonest policy bits, each corresponding to a dishonest policy. In this example, one dishonest policy is called "suppress to zero" indicated by "Z", which specifies that a write to the address range is discarded and a load from that address range returns all zeros. Another dishonest policy is called "suppress to junk" indicated by "J", which specifies that a write to the address range is discarded and a load from that address range returns a random or pseudo-random number. When either Z or J bit is set, any writes to the affected region that are not authorized are discarded, but acknowledged as accepted or approved. Any reads from the region that are not authorized are also acknowledged as accepted or approved, but the data returned from the reads is either all-zero, or else hardware-generated random (RNG) or pseudo-random (pRNG) numbers. When an authorized (allowed) access is performed to the memory region (indicated by R bit and/or W bit being set), all reads and writes are processed as per normal rules of the underlying micro-architecture.

Although only two dishonest policy bits are shown in FIG. 2, it is understood that the permission table 122 can include any numbers of dishonest policy bits. Additional dishonest policies can be defined and their corresponding dishonest policy bits can be added to the permission table 122. For example, optimizations can be made to avoid the evidence of dishonest policies being in use. That is, optimizations can be made to a returned value of a read access, such that the return value is plausibly true but is not the actual value stored in the requested memory location. In one embodiment, the optimizations use one or more of the following approaches: (1) small quasi-random time windows, where the returned values are the same within the same time window, and the returned values can be different in different time windows; (2) a rotating small table of values periodically replaced with new random or pseudo-random values and returned in a predetermined order; (3) a bloom filter, which is a space-efficient probabilistic data structure that can be constructed in hardware to track write information in the memory locations. A bloom filter can apply a given probability function to previous writes that were made to the requested memory location to generate a returned value; a combination of any of the above, etc.

In one embodiment, the permission table 122 for one core can be stored in a memory region that is not accessible by other cores, or is stored in a memory location protected from access by other cores using the dishonest policies described herein.

FIG. 2B illustrates an example of a multi-core processing system including two cores (e.g., core_1 23 and core_2 24). In the example of FIG. 2B, the memory access of the two cores 23 and 24 is managed by single memory management hardware 250 (such as the memory management hardware 110 of FIG. 1). In an alternative embodiment, the memory access of the two cores 23 and 24 can be managed by two separate memory management hardware. Although only two cores are shown, it is understood that a multi-core processing system can include any number of cores.

In the multi-core processing system, each core is associated with a permission table, which includes an ingress portion and an egress portion. In some embodiments, the ingress portion and the egress portion can be constructed as two separate tables (e.g., tables 231 and 232 for core_1 and tables 241 and 242 for core_2). The ingress portion (or ingress table) of a given core specifies the access permission for an application that runs on the other core(s) in the multi-core processing system and submits access requests to the given core. The egress portion (or egress table) of a given core specifies the access permission for an application that runs on the given core and submits access requests to the given core. The permission table of a given core, including the ingress portion and the egress portion, can be modified only by the given core; more specifically, only by trusted software running on the given core.

For example, core_1 may be running a Web browser and core_2 may be running a browser plugin such as a media player. The Web browser may be allocated with a memory region R_1 that is not accessible by the media player, and the media player may be allocated with a memory region R_2 that is not accessible by the Web browser. In addition, a common memory region R_3 may be allocated in which the Web browser can save data for the media player to playback. For security reasons, the permission tables for core_1 and core_2 can be set up as follows:

Ingress for core_1 (Web browser): R_1 (dishonest policy bit set), R_3 (writable).

Egress for core_1 (Web browser): R_1 (readable, writable), R_3 (writable).

Ingress for core_2 (media player): R_2 (dishonest policy bit set), R_3 (readable)

Egress for core_2 (media player): R_2 (readable, writable), R_3 (readable)

In this example, ingress and egress permission tables for core_1 do not include the R_2 region. Thus, any request submitted to core_1 for accessing R_2 will cause a failure. In an alternative embodiment, the ingress and egress permission tables may include the R_2 region and a dishonest policy bit (e.g., Z) can be set for the R_2 region. This dishonest policy indicates to the requesters that no plugin is installed, which is a form of dishonesty. Other dishonest policies may also be used. Similarly, the ingress and egress permission tables for core_2 in this example do not include the R_1 region. Thus, any request submitted to core_2 for accessing R_1 will cause a failure. In an alternative embodiment, the ingress and egress permission tables may include the R_1 region and a dishonest policy bit (e.g., Z) can be set for the R_1 region. This dishonest policy indicates to the requesters that no browser is installed, which is a form of dishonesty. Other dishonest policies may also be used In a multi-core system that includes more than two cores, multiple cores can be grouped together to form a core group. Each core group is a cohesive unit for performing a task. The multi-core system can include one or more core groups. In one embodiment, instead of defining a permission table for a single core, a permission table can be defined (i.e., configured) for a core group such that the core group has a single interface set for ingress and egress, simplifying the design of the permission table. The ingress table of a given core group specifies the access permission for an application that runs on another core group in the multi-core processing system and submits access requests to the given core group. The egress table of the given core group specifies access permission for an application that runs on the core group and submits access requests to the core group. In one embodiment, a set of permission tables can be configured for each core group and another set of permission tables can be configured for each core, such that an application can switch back and forth between these permission tables in different modes of operation to obtain different degrees of security as necessitated by the operation.

Figure 3:
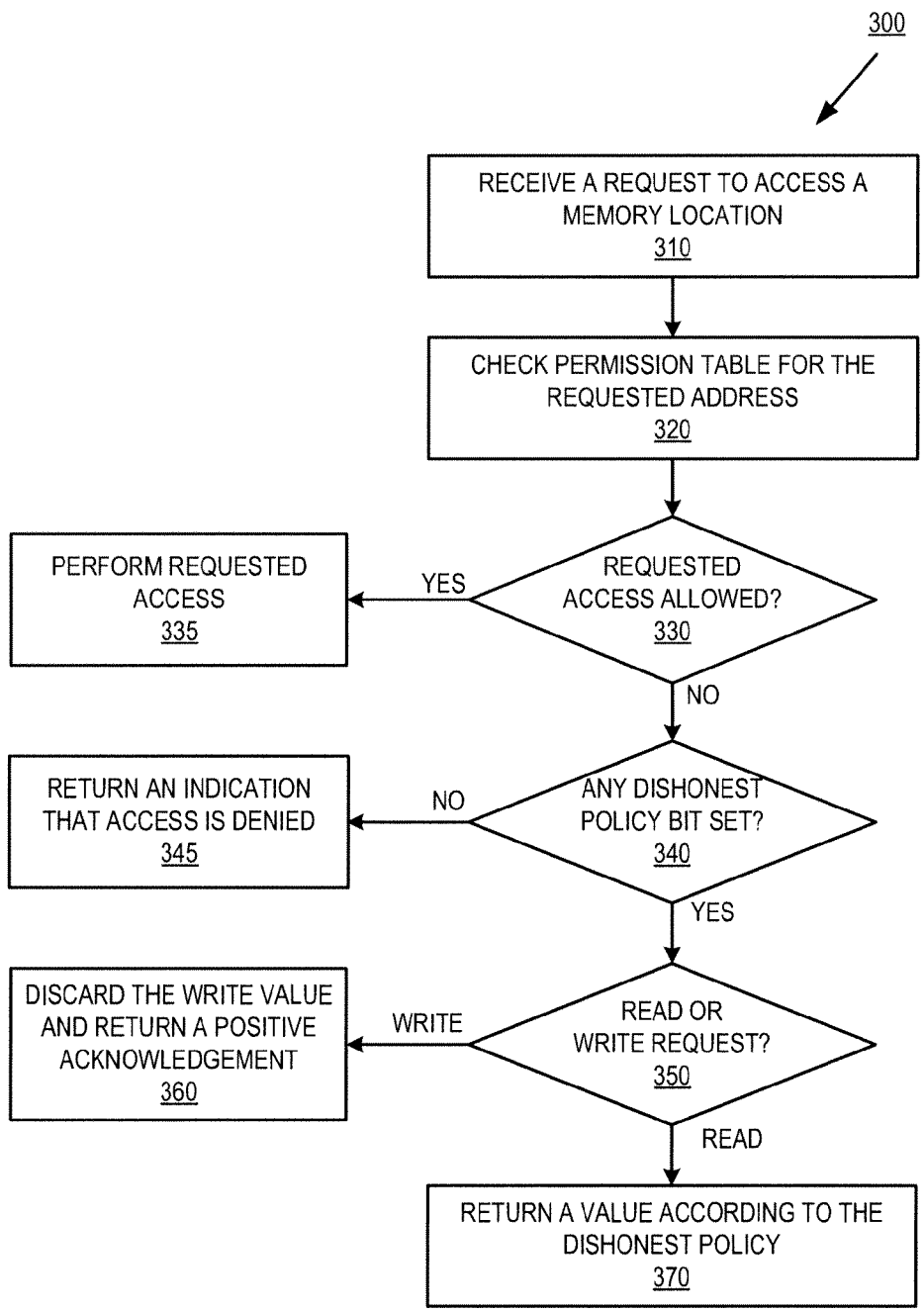
FIG. 3 is a flow diagram illustrating operations to be performed according to one embodiment.

FIG. 3 is a flow diagram of an embodiment of a method 300 performed by memory management hardware to manage memory access. The method 300 begins with the memory management hardware receives a request to access a memory location (block 310) and checks a permission table for access permission for that location (block 320). If the requested access is allowed (block 330), the requested access (either read or write) is performed (block 335). If the requested access is not allowed (block 330) and no dishonest policy bit is set (block 340), the access is denied and an indication of denied access is returned (block 345). If the requested access is not allowed (block 330) and a dishonest policy bit is set (block 340), the access is performed according to the dishonest policy. In one embodiment, if the access request is a write request (block 350), the write value is discarded and a positive acknowledgement is returned to falsely indicate that the write request has been allowed (block 360). If the access request is a read request (block 350), a value is returned in response to the read request according to the dishonest policy corresponding to the set dishonest policy bit (block 370). In one embodiment, the returned value is plausibly true but not the actual value stored in the memory location.

Figure 4:
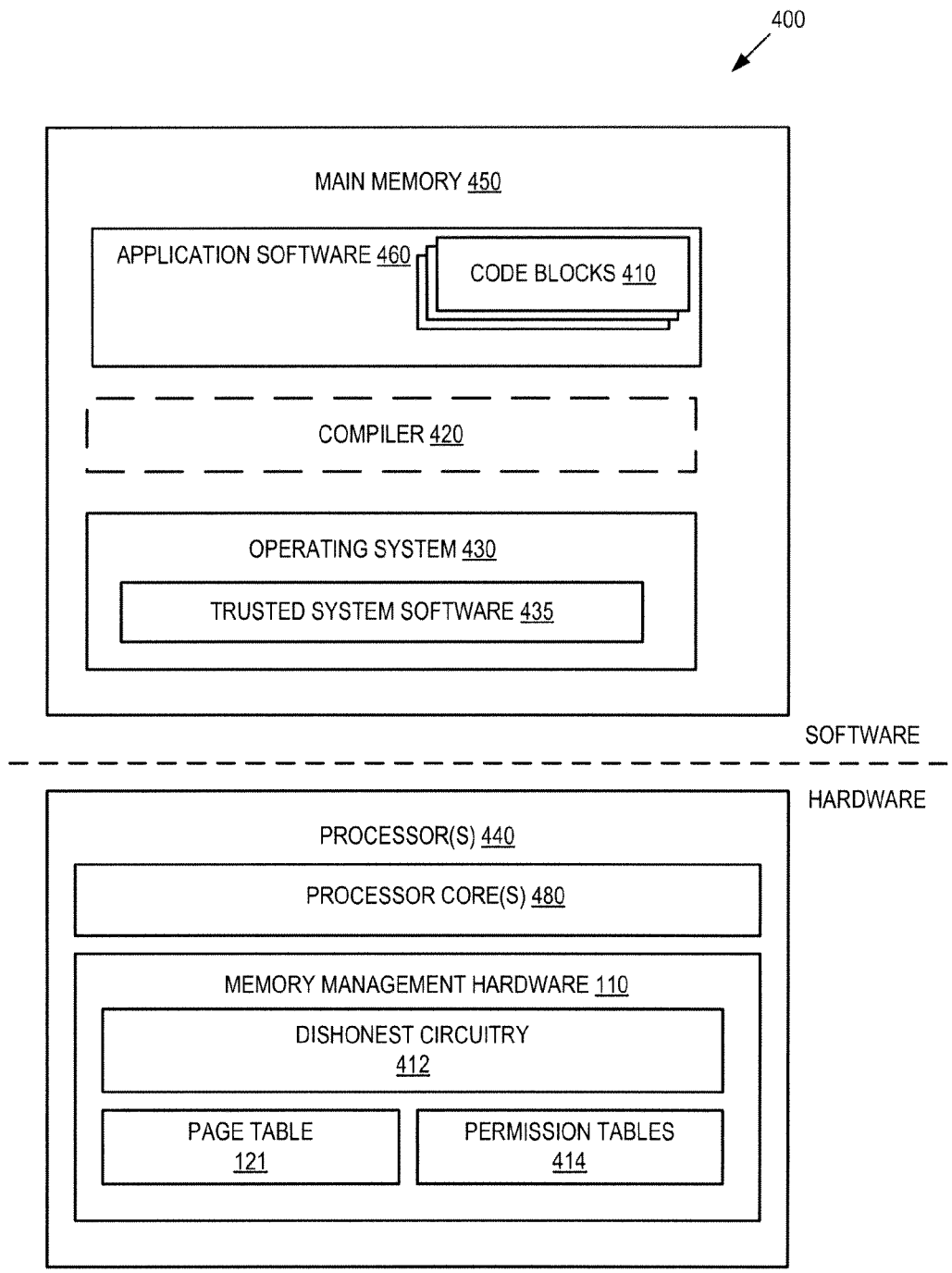
FIG. 4 illustrates elements of a system for memory management according to one embodiment.

FIG. 4 illustrates elements of a computing system 400 according to one embodiment. As shown in FIG. 4, the computing system 400 includes a main memory 450 to store software, and also includes hardware elements to support the software. The software may include application software 460 (containing execution code blocks 410) and an OS 430. In one embodiment, the execution code blocks 410 are compiled with a compiler 420, which may reside in the main memory 450 or in the memory of a different system. The compiler 420 can be a static compiler or a just-in-time compiler. In some embodiments, the execution code blocks 410 may reside in any other software running on the OS 430 (including another OS running on a virtual machine that is managed by a virtual machine manager). In one embodiment, the execution code blocks 410 may be part of the OS 430. The OS 430 includes trusted software 435 that can configure permission tables 414 (e.g., the permission table 122 of FIG. 1 and FIG. 2A, and the permission tables 231, 232, 241 and 242 of FIG. 2B).

The system 400 further includes hardware elements, such as one or more processors 440. The processors 440 may include multiple processor cores 480. The processors 440 also include the memory management hardware 110 (of FIG. 1). The memory management hardware 110 includes the page table 121 and the permission tables 414. In one embodiment, the memory management hardware 110 also includes dishonest circuitry 412 to generate returned indication in response to an access request. When the circuitry 412 receives a disallowed write request, it generates a positive acknowledgement indicating that the requested write operation has been performed. When the circuitry 412 receives a disallowed read request, it generates, according to a dishonest policy, a zero value, a random value, a pseudo-random value, a value generated by a bloom filter, a value generated from a table in a predetermined order, a time-varying value, a value generated from a stochastic process, or a combination of any of the above. The generated returned value serves as an indication that the requested read operation has been performed.

Figure 5:
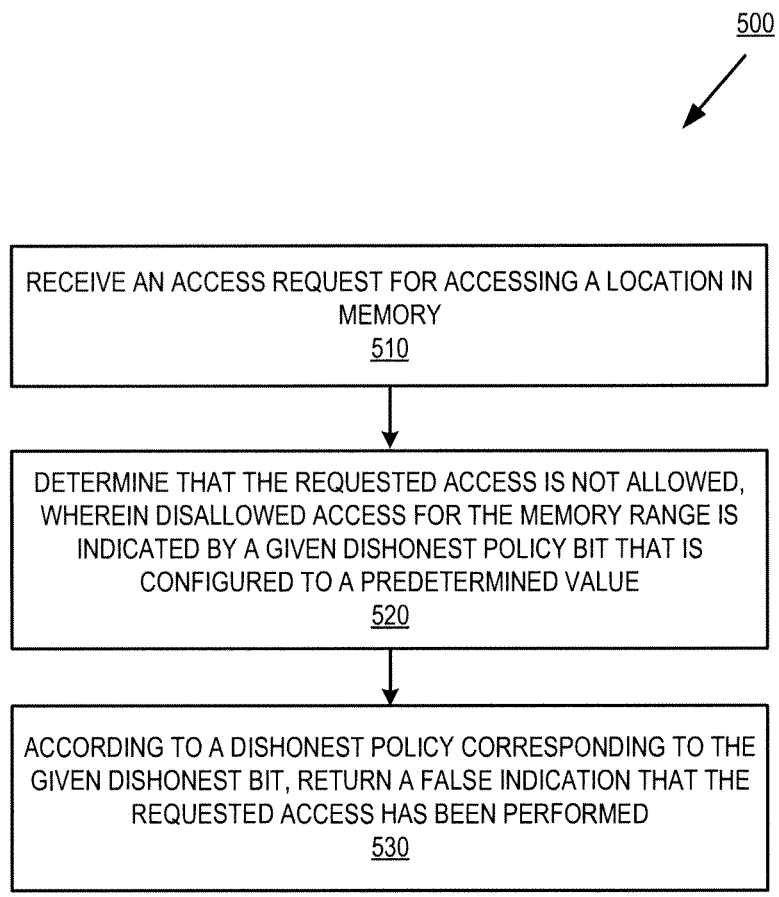
FIG. 5 is a flow diagram illustrating operations to be performed according to one embodiment.

FIG. 5 is a block flow diagram of an embodiment of a method 500 performed by a processor; more specifically, by memory management hardware such as the memory management hardware 110 of FIG. 1. The method 500 begins with a processor receives an access request for accessing a location in memory (block 510). The processor determines that the requested access is not allowed; the disallowed access for the memory range is indicated by a given dishonest policy bit that is configured to a predetermined value (block 520). According to a dishonest policy corresponding to the given dishonest policy bit, the processor returns an indication that the requested access has been performed (block 530).

In various embodiments, the methods of FIGS. 3 and 5 may be performed by a general-purpose processor, a special-purpose processor (e.g., a graphics processor or a digital signal processor), or another type of digital logic device or instruction processing apparatus. In some embodiments, the methods of FIGS. 3 and 5 may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the methods of FIGS. 3 and 5.

In some embodiments, the instruction processing apparatus 115 of FIG. 1 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 6:
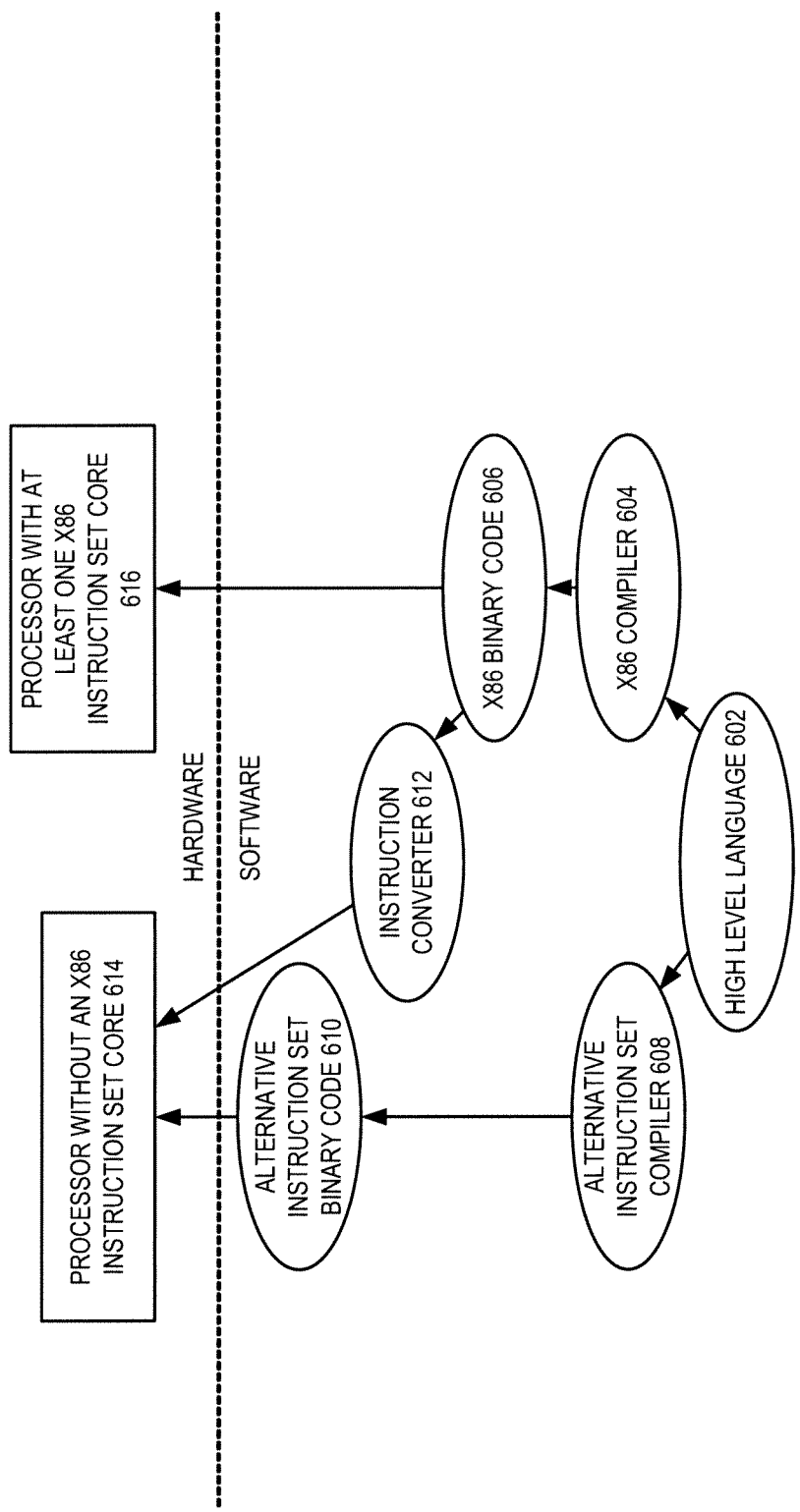
FIG. 6 is a block diagram illustrating the use of a software instruction converter to convert binary instructions in a source instruction set to binary instructions in a target instruction set according to one embodiment.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-order and Out-of-order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
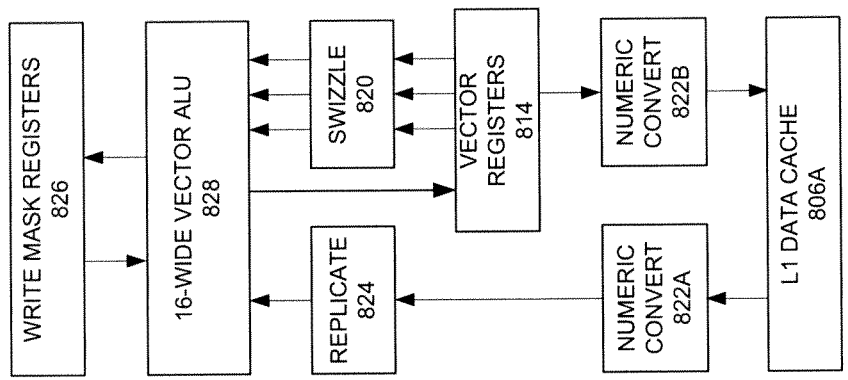
FIGS. 8A-B are block diagrams of a more specific exemplary in-order core architecture according to one embodiment.
Figure 8A:
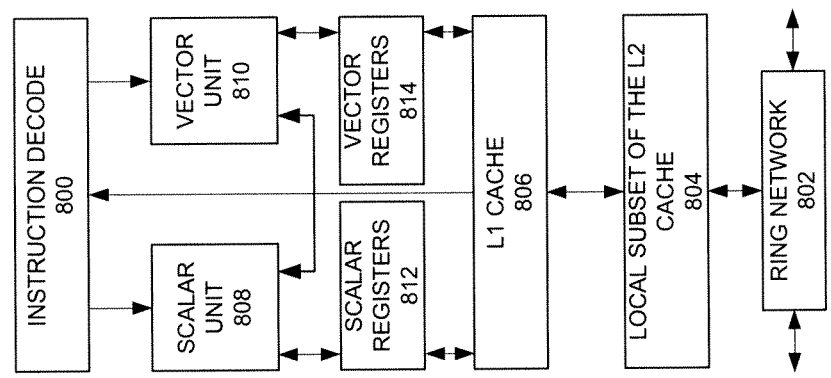

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
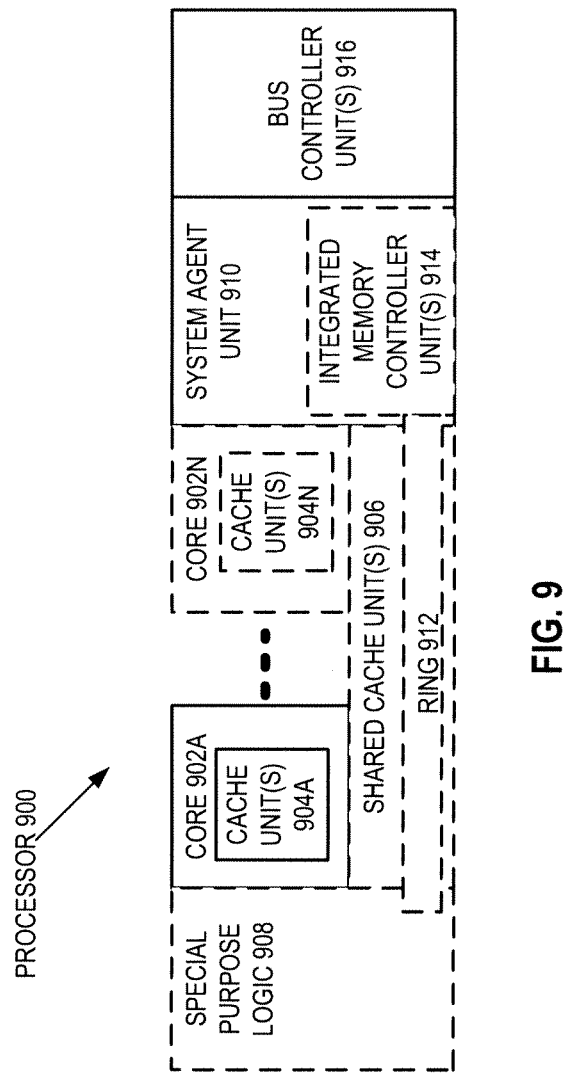
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
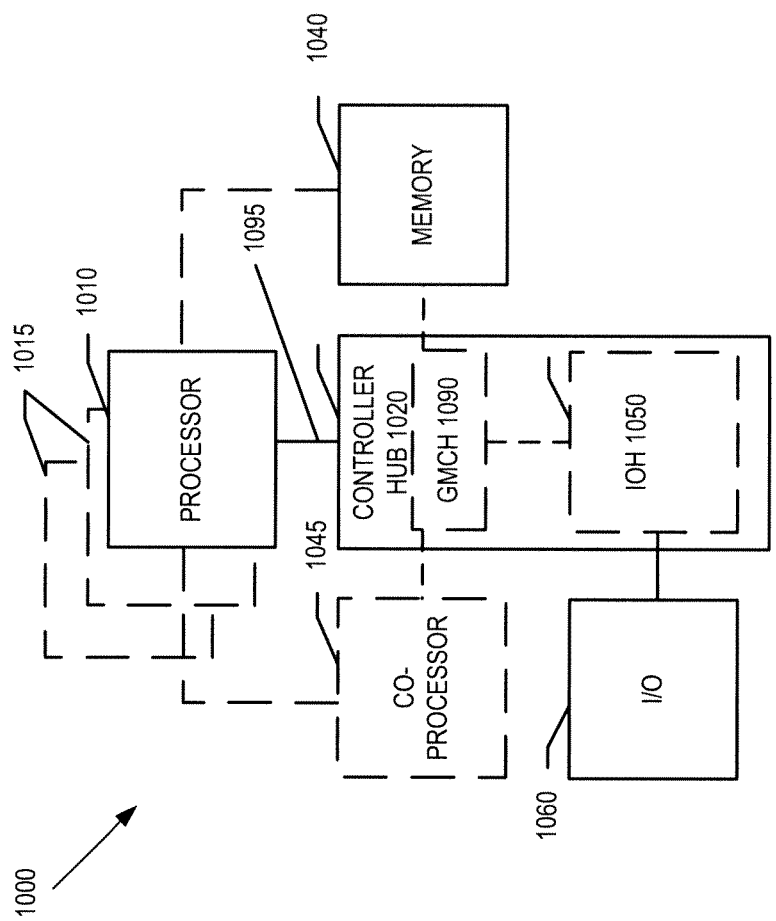
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
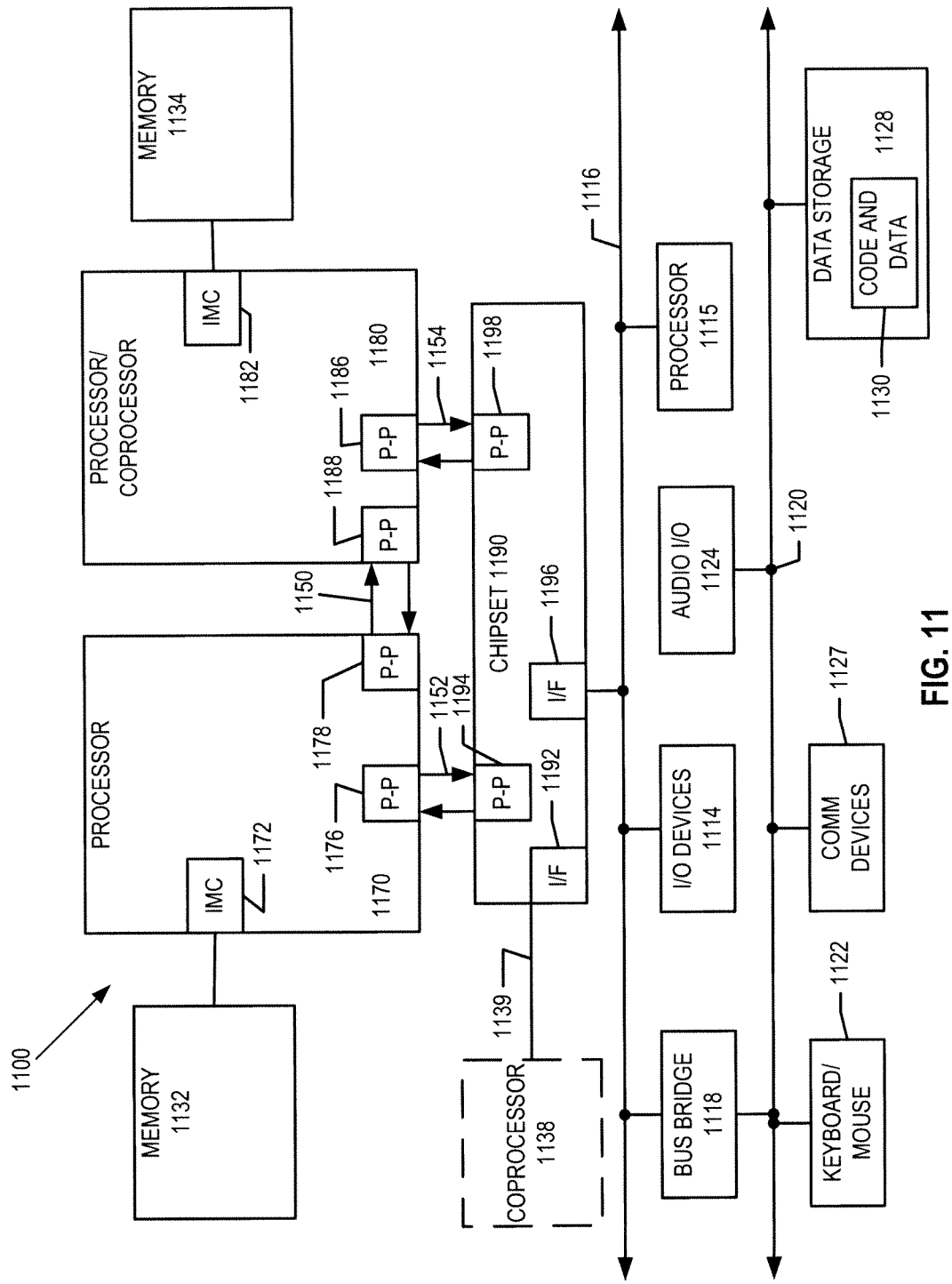
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198.

Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
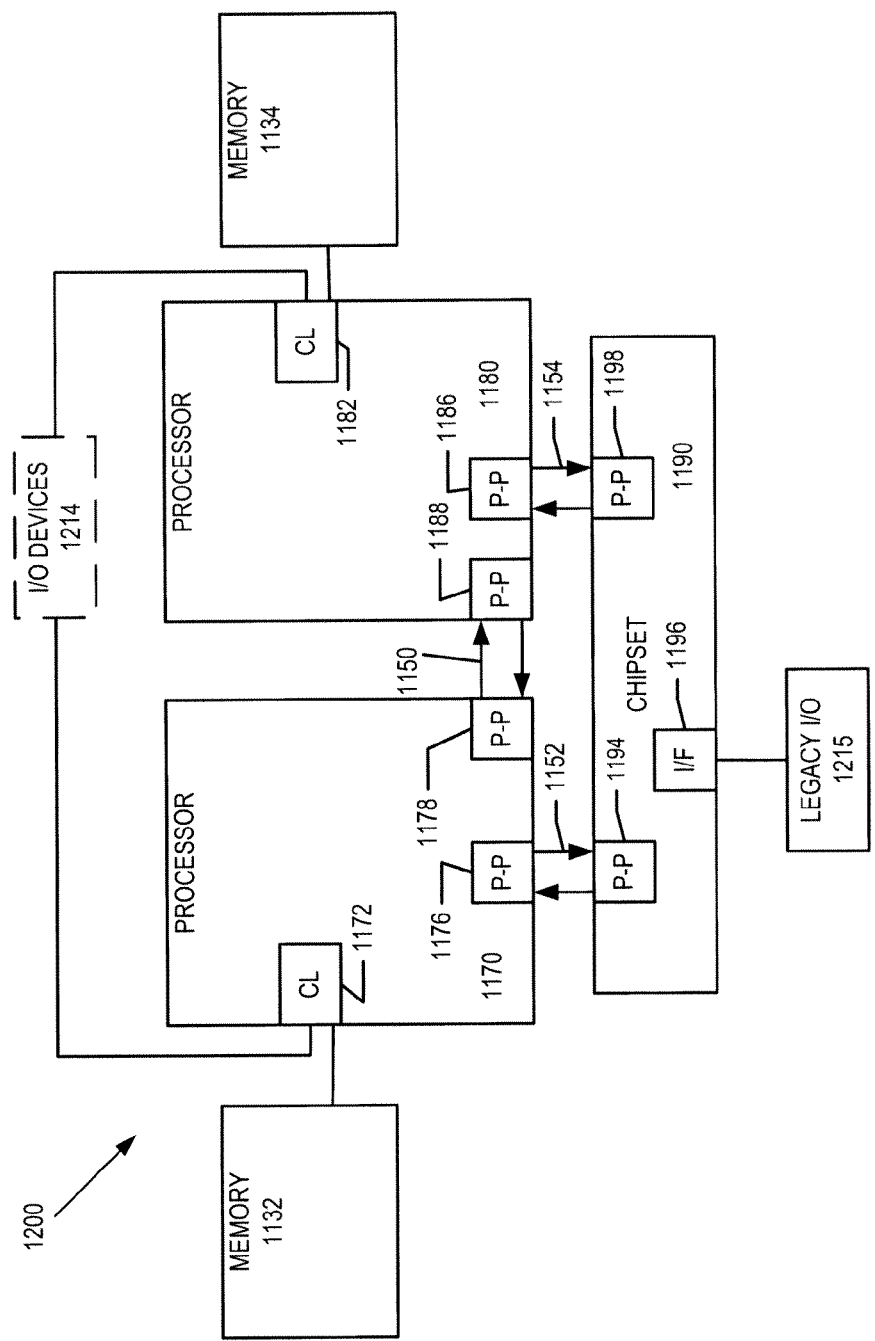
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
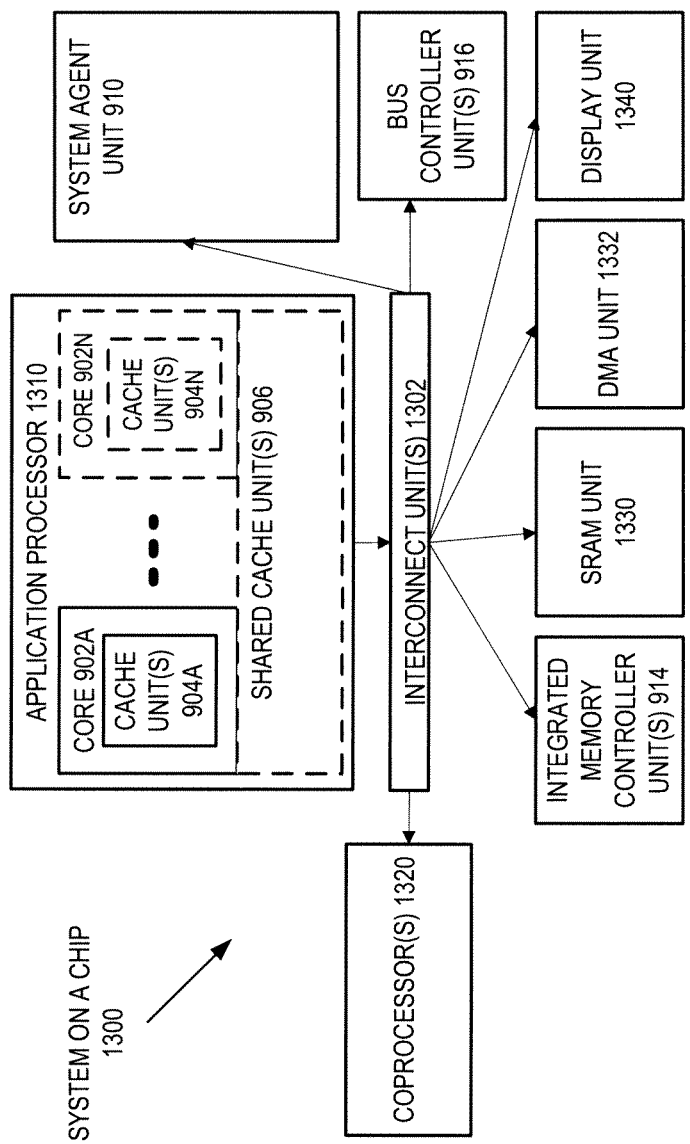
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
memory management hardware to store a plurality of dishonest policy bits per memory range, each dishonest policy bit indicating disallowed access for a corresponding memory range and wherein a first dishonest policy bit when set is to specify that a write to the corresponding memory range is to be discarded and a load from the corresponding memory range is to return a random number, and a second dishonest policy bit when set is to specify that a write to the corresponding memory range is to be discarded and a load from the corresponding memory range is to return all zeros; and
a processor coupled to the memory management hardware, the processor including circuitry to receive an access request for a location in a memory range to which access is not allowed as indicated by a given one of the dishonest policy bits that is configured to a value, and to return a false indication according to a given dishonest policy corresponding to the given dishonest policy bit that the requested access has been performed.

2. The apparatus of claim 1, wherein the set of dishonest policy bits are stored in a hardware permission table separate from a page table.

3. The apparatus of claim 1, wherein the set of dishonest policy bits are stored in an extension of a page table, which is accessible by the processor for translation of virtual memory addresses.

4. The apparatus of claim 1, wherein the set of dishonest policy bits are configurable by trusted software.

5. The apparatus of claim 1, wherein the processor according to the given dishonest policy is to return, in response to a read request, a value that is not an actual content stored in the location in the one of the memory ranges.

6. The apparatus of claim 1, wherein the processor according to the given dishonest policy is to discard a write value in response to a write request and return an acknowledgement to the write request.

7. The apparatus of claim 1, wherein the processor is a given core in a multi-core processing system, and wherein the memory management hardware for the given core includes an ingress portion and an egress portion, the ingress portion specifying a first set of access permission for a first application that runs on other cores in the multi-core processing system and submits access requests to the given core, and the egress portion specifying a second set of access permission for a second application that runs on the given core and submits the access requests to the given core.

8. The apparatus of claim 1, wherein the processor belongs to a core group of a plurality of cores in a multi-core processing system, the memory management hardware for the core group includes an ingress portion and an egress portion, the ingress portion specifying a first set of access permission for a first application that runs on another core group in the multi-core processing system and submits access requests to the core group, and the egress portion specifying a second set of access permission for a second application that runs on the core group and submits the access requests to the core group.

9. A method comprising:
receiving by a processor an access request for accessing a location in a memory range;

determining that the requested access is not allowed, wherein disallowed access for the memory range is indicated by a given one of a set of dishonest policy bits that is configured to a value for the memory range, wherein a first dishonest policy bit when set is to specify that a write to the corresponding memory range is to be discarded and a load from the corresponding memory range is to return a random number, and a second dishonest policy bit when set is to specify that a write to the corresponding memory range is to be discarded and a load from the corresponding memory range is to return all zeros; and according to a dishonest policy corresponding to the given dishonest policy bit, returning a false indication that the requested access has been performed, wherein returning the false indication comprises:

returning, in response to a read request, a random number when the first dishonest policy bit is set, and returning, in response to a read request, all zeros when the second dishonest policy bit is set.

10. The method of claim 9, wherein the set of dishonest policy bits are stored in a hardware permission table separate from a page table.

11. The method of claim 9, wherein the set of dishonest policy bits are stored in an extension of a page table, which is accessible by the processor for translation of virtual memory addresses.

12. The method of claim 9, wherein the set of dishonest policy bits are configurable by trusted software.

13. The method of claim 9, wherein returning the false indication further comprises:

returning same values in response to a first set of read requests received within a quasi-random time window; and returning different values in response to a second set of read requests received in different quasi-random time windows.

14. The method of claim 9, wherein returning the false indication further comprises:

returning, in response to a read request, a value in a predetermined order from a rotating table of values, which are periodically replaced with new random or pseudo-random values.

15. The method of claim 9, wherein returning the false indication further comprises:

returning, in response to a read request, a value generated from a bloom filter which applies a probability function to previous writes that were made to the location in the memory range.

16. The method of claim 9, wherein returning the false indication further comprises:

discarding a write value in response to a write request; and
returning an acknowledgement to the write request.

17. A system comprising:

memory to store code and data;

memory management hardware to store a plurality of dishonest policy bits per memory range, each dishonest policy bit indicating disallowed access for a corresponding memory range and wherein a first dishonest policy bit when set is to specify that a write to the corresponding memory range is to be discarded and a load from the corresponding memory range is to return a random number, and a second dishonest policy bit when set is to specify that a write to the corresponding memory range is to be discarded and a load from the corresponding memory range is to return all zeros; and a processor coupled to the memory management hardware, the processor including circuitry to receive an access request for a location in a memory range to which access is not allowed as indicated by a given one of the dishonest policy bits that is configured to a value, and to return a false indication according to a given dishonest policy corresponding to the given dishonest policy bit that the requested access has been performed.

18. The system of claim 17, wherein the set of dishonest policy bits are stored in a hardware permission table separate from a page table.

19. The system of claim 17, wherein the set of dishonest policy bits are stored in an extension of a page table, which is accessible by the processor for translation of virtual memory addresses.

20. The system of claim 17, wherein the set of dishonest policy bits are configurable by trusted software.

\* \* \* \* \*